(12) United States Patent
Birsan et al.

(10) Patent No.: US 7,904,403 B2
(45) Date of Patent: Mar. 8, 2011

(54) METHOD FOR SOLVING APPLICATION FAILURES USING SOCIAL COLLABORATION

(75) Inventors: Valentina Birsan, Toronto (CA); Marin Litolu, Toronto (CA); Kevin Quan, Toronto (CA); Paul Andrew Solomon Ward, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 11/966,162

(22) Filed: Dec. 28, 2007

(65) Prior Publication Data

US 2009/0171935 A1    Jul. 2, 2009

(51) Int. Cl.
G06F 17/00 (2006.01)
G06N 5/00 (2006.01)

(52) U.S. Cl. .......................................................... 706/45
(58) Field of Classification Search ...................... 706/45
See application file for complete search history.

(56) References Cited

U.S. PATENT DOCUMENTS

| | | |
|---|---|---|
| 2004/0055452 A1 | 3/2004 | Tabor |
| 2006/0036562 A1 | 2/2006 | Wu |
| 2006/0112053 A1 | 5/2006 | Jeanblanc et al. |
| 2006/0167844 A1 | 7/2006 | Srinivas et al. |

OTHER PUBLICATIONS

"Outsourcing Innovation through Collaborative Problem Solving", May 14, 2007, PowerHomeBiz, Vancouver, Canada, pp. 1-3, retrieved Dec. 5, 2007 http://www.powerhomebiz.com/News/052007/problem-solving.htm.
Defranco-Tommarello et al., "Collaborative Problem Solving and Groupware for Software Development" Information Systems Management, Winter 2004, pp. 67-80.
Ehrlich et al., "Turning Information into Knowledge: Information Finding as a Collaborative Activity", Proceedings of Digital Libraries '94 Conference, College Station, Texas, Jun. 1994, pp. 1-12.
Guzdial et al., Integrating and Guiding Collaboration: Lessons Learned in Computer-Supported Collaborative Learning Research at Georgia Tech, Proceedings of Computer Supported Collaborative Learning '97, Toronto 1997, pp. 1-11.

*Primary Examiner* — Michael Holmes
(74) *Attorney, Agent, or Firm* — Yee & Associates, P.C.; Jill A. Poimboeuf (57) ABSTRACT

A computer-implemented method, system and computer usable program code for solving an application failure using social collaboration are provided. A search request to search a central repository of knowledge is received. The search request comprises a user identity and an application failure problem to be solved. The central repository of knowledge comprises data regarding attempts to solve an application failure problem compiled from registered users of the central repository of knowledge. A determination is made as to whether the application failure problem to be solved exists in the central repository. If the application failure problem to be solved exists within the central repository, search results for previous attempts at solving the application failure problem are collected. The search results are ranked based on a frequency of access and feedback from users and are grouped according to social groupings defined by the requester. The results are displayed to a requester.

20 Claims, 4 Drawing Sheets

METHOD FOR SOLVING APPLICATION FAILURES USING SOCIAL COLLABORATION

BACKGROUND OF THE INVENTION

1. Field of the Invention

The present invention relates generally to a data processing system. More specifically, the present invention relates to a method, system, and computer program product for solving application failures using social collaboration.

2. Description of the Related Art

As consumers' needs increase, so does application complexity. More and more applications are running on multiple platforms and hosts, and are built using separate components provided by different groups. Because of this increased complexity, finding the reason for an application failure is very difficult for the average user. Even if the failure is reported through an error message and message number, frequently, the error is not descriptive enough, in the context of the application as a whole, to explain why the exception happened.

A current solution to the problem is a tedious, manual search for an explanation of the error that occurred. This type of search typically requires looking at existing comments and explanations of the problem, such as, for example, through a web search, or conversations within a development team. Both of these approaches are inefficient. A web search does not capture the effort exerted by previous users who have attempted to solve the same problem; which may include members of a current development team, the user themselves, or other people around the world that encounter the same problem under similar circumstances. Asking fellow development team members for help imparts a cost on their time to explain the solution.

SUMMARY OF THE INVENTION

Exemplary embodiments provide a computer-implemented method, system, and computer usable program code for solving an application failure using social collaboration. A search request to search a central repository of knowledge is received from a requester. The search request comprises a user identity and an application failure problem to be solved. The central repository of knowledge comprises data regarding at least one previous attempt to solve an application failure problem compiled from registered users of the central repository of knowledge. A determination is made as to whether the application failure problem to be solved exists in the central repository. Responsive to a determination that the application failure problem to be solved exists in the central repository, search results for at least one previous attempt to solve the application failure problem are collected. The search results comprise a universal resource locator. The search results are grouped into a plurality of groups corresponding to social groupings defined by the requester, forming grouped search results. The grouped search results are displayed to the requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
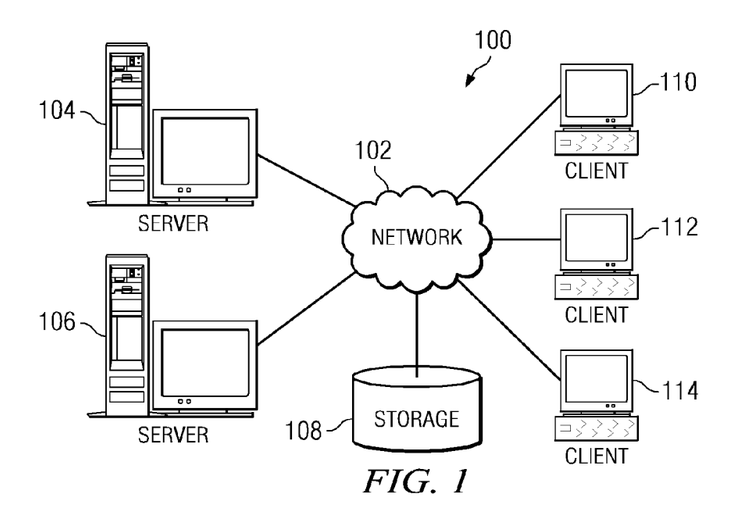
FIG. 1 depicts a pictorial representation of a network of data processing systems in which illustrative embodiments may be implemented.
Figure 2:
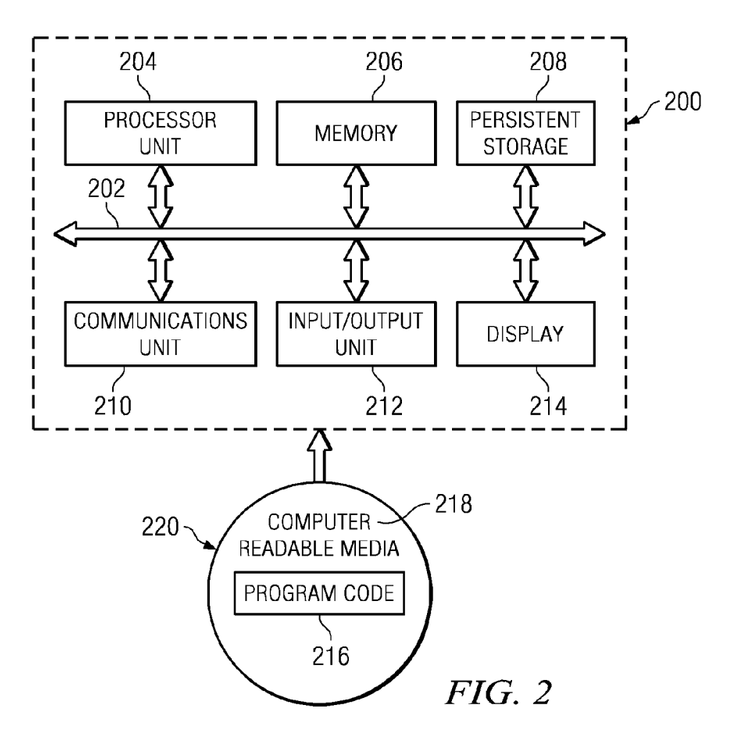
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, servers 104 and 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide for solving application failures by leveraging user-defined and structural social relationships. The social relationships are used to filter past experiences submitted by users with solving the same or a similar application failure as the failure experienced by the current user, in order to present the most relevant web links available to solve the current user's application failure.

Social relationships are defined by the user, and capture the user's trust and confidence in the ability of another user. User-defined social relationships include groups, such as groups of peers or friends. Additional existing relationships are utilized, such as teams to which the user is a member, in order to bring together collaboration groups that are working under similar circumstances. A user may define multiple groups of peers, friends, or teams to which the user belongs. The usage of these, constructed during the display of past experiences, ensures that the web links presented are more related to the current user's problem solving task than a generic web search. Additionally, the current user spends less time determining whether a web link is relevant to his/her task, as this process has already been performed by his/her peers.

After the failure has been solved, the current user's experience, as captured by the web links the current user visited during the problem resolution, are submitted to a central repository and made available to future users. Each web link that is submitted is tagged with the current user's identity and a description of the task the current user performed, such as for example, solving a particular application failure. Additionally, the current user provides feedback regarding the usefulness of the web links used in the process or the type of information garnered from the web links used in the process in order to provide additional data to future users. The feedback is used to rank results more accurately for future users.

Exemplary embodiments utilize social collaborations to filter an entire community's experience in solving a specific problem based on the current user's social relationships, promote the current user's experience in solving a specific problem to the attention of other users in their social network, and utilize feedback from within a user's social network to improve the accuracy in ranking resources useful for solving a particular problem.

Figure 3:
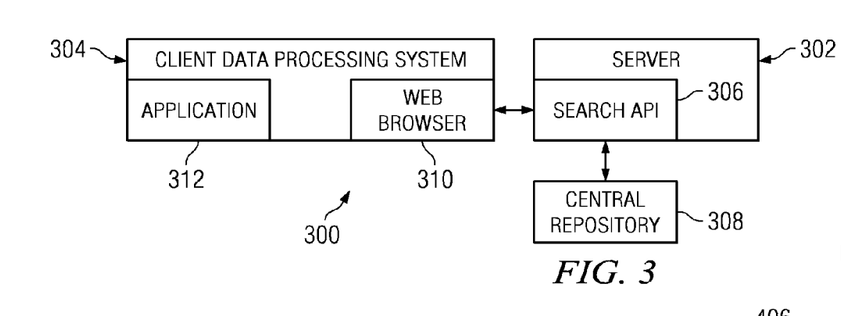
FIG. 3 is a block diagram of system in which exemplary embodiments may be implemented.

Turning back to the figures, FIG. 3 is a block diagram of system in which exemplary embodiments may be implemented. System 300 comprises server 302, which may be implemented as a server, such as server 104 in FIG. 1, and a client data processing system 304, which may be implemented as a data processing system such as data processing system 200 in FIG. 2.

An application program interface (API), search API 306, for searching a central repository of knowledge regarding application failures, central repository 308, is resident on server 302. Central repository 308 may be implemented as a database, a set of tables, a set of databases, a set of relational databases, or in any form appropriate for a particular implementation. Application 312 and web browser 310 are resident on client data processing system 302.

A web browser is a software application that enables a user to display and interact with text, images, videos, music, and other information typically located on a Web page at a website on the World Wide Web or a local area network. Text and images on a Web page can contain hyperlinks to other Web pages at the same or different website. Web browsers allow a user to quickly and easily access information provided on many Web pages at many websites by traversing these links. Web browsers format HTML information for display, so the appearance of a Web page may differ between browsers.

When a user of client data processing system 304 encounters a failure of application 312, the user communicates with server 302 through web browser 310 and accesses search API 306. The user then inputs search criteria into search API 306, which accesses central repository 308 and searches central repository 308 for results corresponding to the search criteria. The search criteria is based on the error message for the failure of the application. Search API 306 sends the results to web browser 310 in client data processing system 302, wherein the results are displayed to a user for the user to evaluate and use.

It should be noted that web browser 310 is only one example of how a user can communicate with central repository 308. In other exemplary embodiments, alternate communication means are used, such as for example, but not limited to, an application program or a web service.

When a user encounters an application failure, the user is generally presented with an error number/code and a message that attempts to describe the error. In order to determine the root cause of the failure and/or solve the problem, the user must rely on their experience, if available, or attempt to manually search a plethora of sources for the required information. Exemplary embodiments provide a central repository of knowledge and a search interface in order to help users find relevant information about the failure and how to solve it. The central repository of knowledge comprises data regarding attempts to solve an application failure problem compiled from registered users of the central repository knowledge. The search query processed by central repository returns information stored in the central repository. This central repository contains information collected from users as they solved similar problems in the past.

Exemplary embodiments provide that when a user searches the central repository, a plurality of lists of results will be returned to the user. The exact number of lists returned depends on the relationship groups that the user has defined. Thus, if a user defines three (3) peer groups and two (2) teams, there will be six (6) lists, including the list comprising all other users. Whereas a user that defines only one (1) peer group and no teams will only have two (2) lists, including the list comprising all other users. Each list will be comprised of ranked links to web pages that have information related to the application failure the current user is attempting to solve. The lists are differentiated from each other by the social relationships used to filter the repository. An example of one list of links is a list of links based on the web links visited by the current user's team members in previous attempts to solve the current user's failure. An example of another list of links is a list of the web links visited by the current user's peers in previous attempts to solve the failure. The last list of links is a list of web links utilized by all users within the central repository that have solved the same failure.

By providing results grouped and ranked according to the current user's social relationships, the highest ranked results will have a more targeted focus. That is, the provided results are more focused to solve specific, recurring failures that the current user and his social network have faced. These social relationships may be team members who share a common goal, such as developing a software application, or peers that are working in the same domain as the current user. Without using these social relationships, the highest ranked results will likely contain information about the most common, worldwide, variant of the problem, which is not necessarily what the current user is facing.

The links within each list are ranked by a combination of the frequency of previous visits by central repository users within the current user's social group and the individual feedback left for each link by a previous user who was solving the same problem. The previous user who left the feedback must also be within the current user's social group criteria. Once the current user has resolved their application failure, all the web links visited during the problem solving process are collected. These links are then passed through several filters to remove irrelevant entries, such as advertisements, and then submitted to the central repository. The current user's identity and the application failure the user was attempting to solve are included in the submission.

The user is then asked for optional feedback on a selection of links the user visited. The user is only asked for feedback on links, which a previous user has submitted, thus helping to refine the ranking process for the links the user visited.

Figure 4:
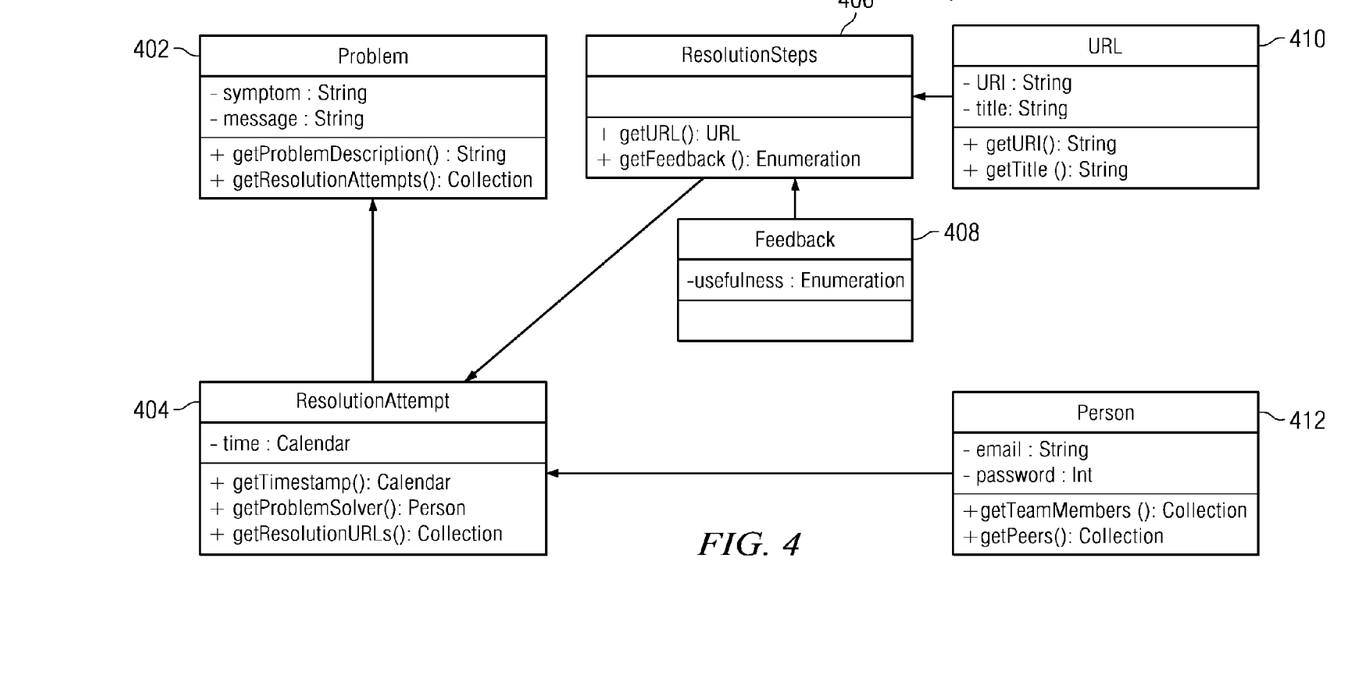
FIG. 4 is diagram illustrating a system for storing and retrieving information regarding solving application failures using social collaboration in accordance with an exemplary embodiment.

FIG. 4 is diagram illustrating a system for storing and retrieving information regarding solving application failures using social collaboration in accordance with an exemplary embodiment. In an exemplary embodiment the information stored in central repository 400, such as central repository 308 in FIG. 3, regarding solving application failures using social collaboration are stored as classes. In the present exemplary embodiment, central repository 400 comprises classes Problem 402, ResolutionAttempt 404, ResolutionSteps 406, Feedback 408, URL 410, and Person 412.

The descriptions of the various classes depicted in FIG. 4 involve examples of various actions and functions that the classes may utilize or perform. It should be understood that the names of the actions and functions are presented as examples and are not intended to in any way limit exemplary embodiments. Thus, in alternate exemplary embodiments, other names for the actions and functions shown in FIG. 4 are used in a class to achieve the same result. Furthermore, it should be understood that the actions and functions are presented as examples of actions and functions that a class may include and are not intended to in any way limit exemplary embodiments. Thus in various alternate embodiments, the classes presented in FIG. 4 include other actions and functions. Furthermore, in alternate exemplary embodiments, central repository 400 includes other additional classes.

Class Problem 402 comprises two attributes: symptom and message, and two actions, getProblemDescription( ) and getResolutionAttempts( ). When a user queries central repository 400, the inquiry includes an input of a symptom and a message. An API, such as search API 306 of FIG. 3, accesses class Problem 402, supplying the attributes symptom and message. This causes class Problem 402 to initiate the action getResolutionAttempts( ). The action getResolutionAttempts( ) accesses class ResolutionAttempt 404, which has an attribute time, which is sourced from a calendar and three possible actions: getTimestamp( ), getProblemSolver( ), and getResolutionURLs( ).

Class ResolutionAttempt 404 invokes the action getProblemSolver( ), which calls class Person 412. Class Person 412 has two attributes, email and password, and two (2) actions, getTeamMembers( ) and getpeers( ). Calling class Person 412 causes both of these actions to be invoked, which recursively calls class Person 412. There is a one-to-one relationship between a prior resolution attempt and the user that attempted the prior resolution attempt. The getTeamMembers( ) action causes a list to be returned comprising the registered users that consider the user that attempted the prior resolution, the resolution currently being queried about, to be a team member. Similarly, the getpeers( ) action causes a list to be returned comprising the registered users that consider the user that attempted the prior resolution, the resolution currently being queried about, to be a peer. Both of the returned lists are checked to determine whether the current user, the user performing the inquiry, is a member of either list. If the current user is determined to be a member of one of the returned lists for the present resolution attempt, then the present resolution attempt is grouped with the appropriate user defined social group. However if the current user is determined not to be a member of either returned list, then the current resolution attempt is grouped with a group comprising all other users.

Class ResolutionAttempt 404 also invokes the action getResolutionURLs( ) (universal resource locator). The purpose of this action is to get a list of URLs that the problem solver used in order to solve the specific problem. The action getResolutionURLs( ) calls class ResolutionSteps 406. Class ResolutionSteps 406 has two actions, getURL( ) and getFeedback( ). Class ResolutionSteps invokes action getURL( ), which calls class URL 410. Class URL 410 has two attributes, URI (universal resource identifier), and title and two actions getURI( ) and getTitle( ). Thus, calling class URL 410 causes the getURI( ) and getTitle( ) actions to be invoked, which return the attributes URI and title, which are then returned to class ResolutionSteps 406 as the URL to the getURL( ) action. The getFeedback action calls class Feedback 408, which has one attribute, usefulness. Usefulness is an enumeration used in determining a ranking for the particular URL.

Figure 5:
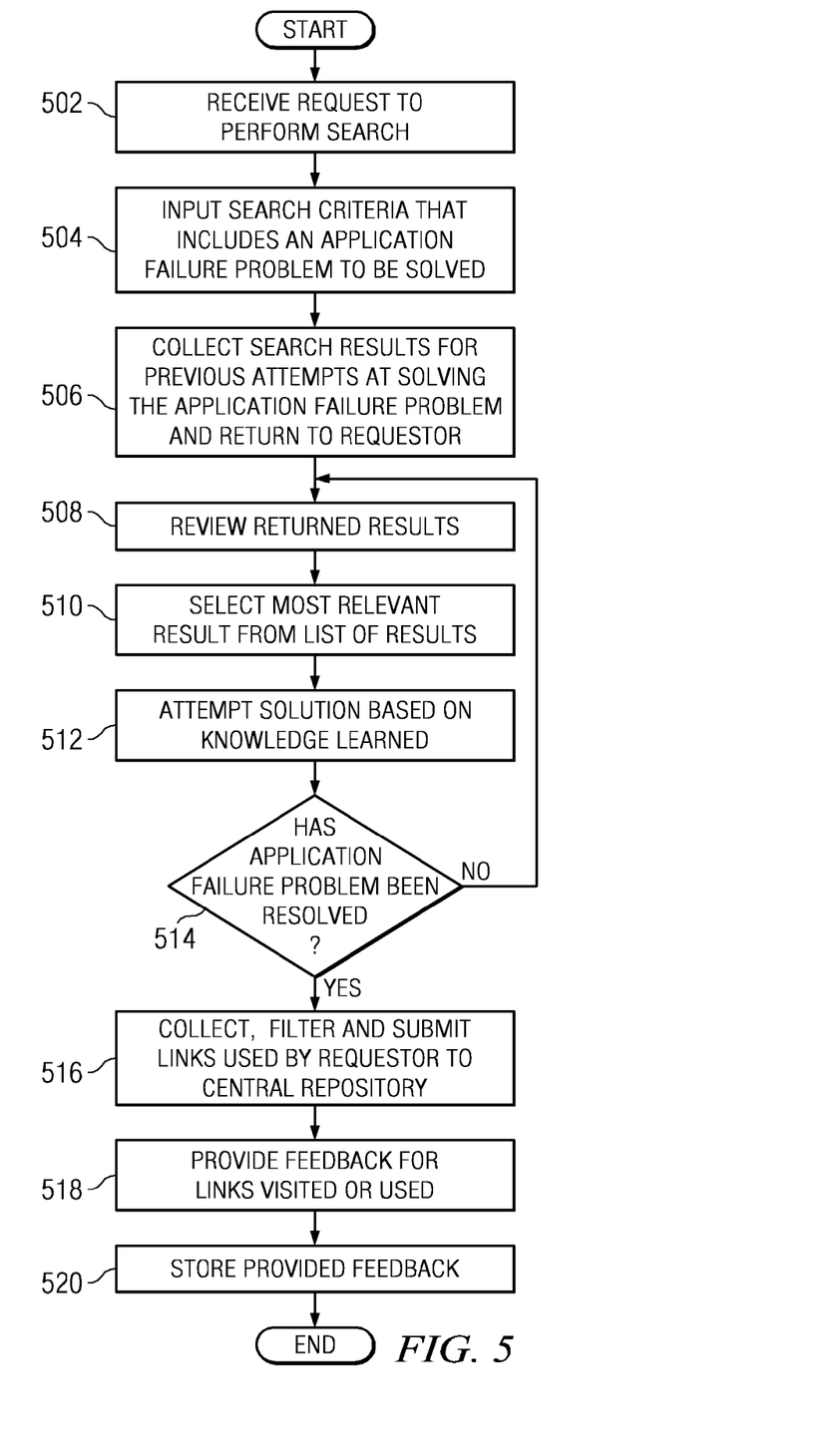
FIG. 5 is flowchart illustrating the operation of a user solving an application failure problem in accordance with an exemplary embodiment.

FIG. 5 is flowchart illustrating the operation of a user solving an application failure problem in accordance with an exemplary embodiment. The operation of FIG. 5 may be performed by a central repository with a search interface, such as central repository 308 and search API 306 of FIG. 3. The operation begins when a request to perform a search is received (step 502). A user inputs search criteria that includes an application failure problem to be solved (step 504). Search results for previous attempts at solving the application failure problem are collected and returned to the requestor (step 506). FIG. 4 describes an exemplary embodiment for collecting search results for previous attempts at solving the application failure and returning the results to a requester. The results are grouped into a plurality of groups, which fall under three broad categories: results from previous attempts to solve the application failure problem by peers of the requester, results from previous attempts to solve the application failure problem by team members of the requester, and results from previous attempts to solve the application failure problem by all others users of the central repository. Furthermore, these results are ranked for relevance within each group of results and, in an alternate embodiment, within all the results as a whole.

The requester reviews the returned results (step 508). The requester selects the most relevant result from the list of results (step 510). A solution is attempted based on the knowledge learned (step 512). A determination is made as to whether the application failure problem has been resolved (step 514). If the application failure problem has not been resolved (a "no" output to step 514), the process returns to step 508, where the requester again reviews the returned results.

If the application failure problem has been resolved (a "yes" output to step 514), the links used by the requester are collected, filtered, and submitted to the central repository (step 516). The requester is asked to provide feedback for the links visited or used by the requester (step 518). The provided feedback is stored (step 520) and the operation ends.

Figure 6:
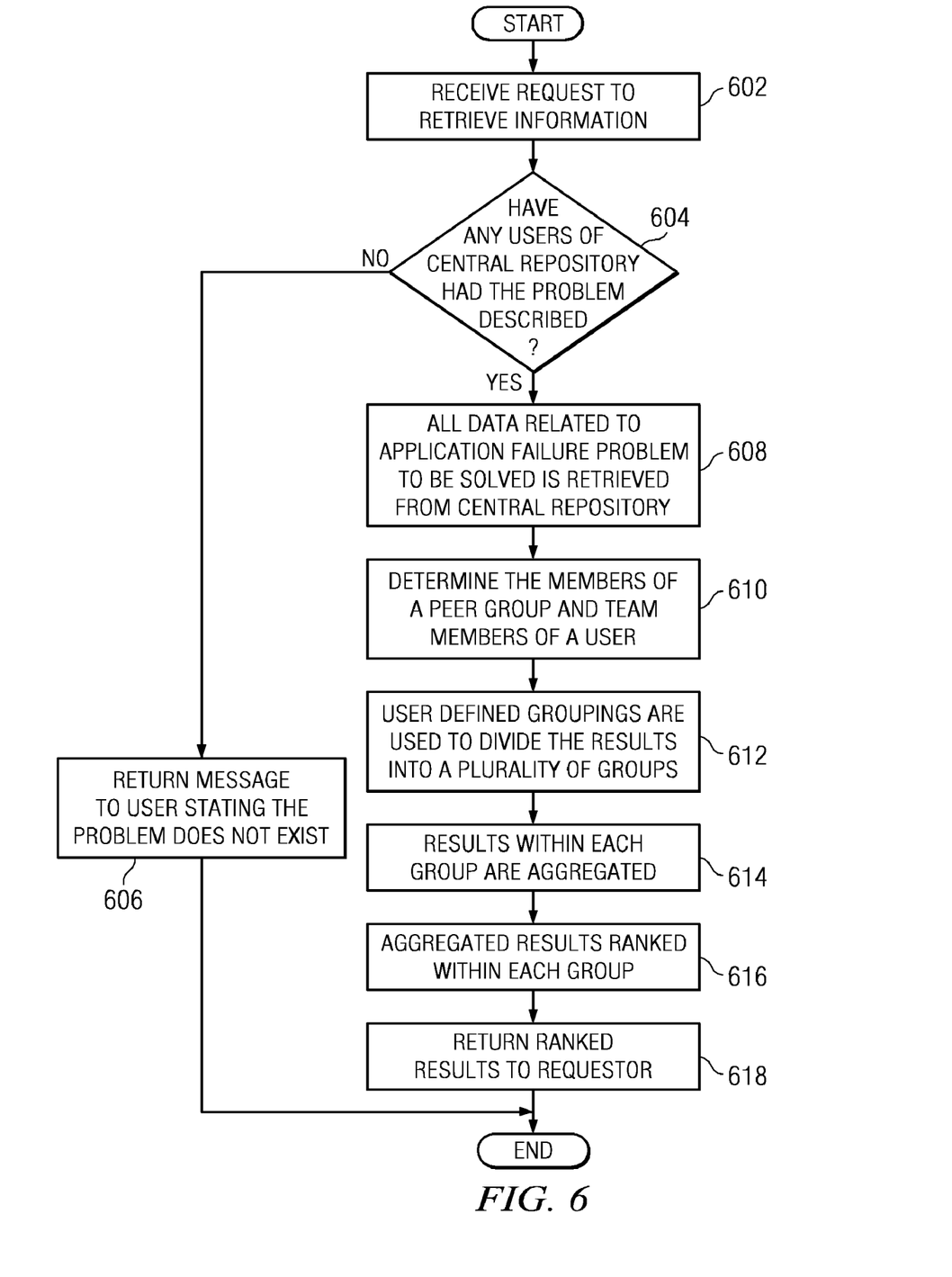
FIG. 6 is a flowchart illustrating the operation of retrieving and storing information in a central repository according to an exemplary embodiment.

FIG. 6 is a flowchart illustrating the operation of retrieving and storing information in a central repository according to an exemplary embodiment. The operation of FIG. 6 may be performed by a central repository, such as central repository 308 of FIG. 3. A request to retrieve information is received (step 602). The request includes a user identity and an error message that describes the application failure problem to be solved. A determination is made as to whether any users of the central repository have had the problem described in the error message (step 604). If the operation determines that no entries exist for the problem (a "no" output to step 604), a message is returned to the user stating that entries for the problem do not exist (step 606) and the operation ends.

If the operation determines that at least one entry exists for the application failure problem to be solved (a "yes" output to step 604), all data related to the application failure problem to be solved is retrieved from the central repository (step 608). FIG. 4 describes an exemplary embodiment for retrieving all data related to the application failure problem to be solved from a central repository and returning the results to a requester. The error message is used to retrieve all the data related to the application failure problem to be solved. The user id is used to determine the members of a peer group and team members of the user (step 610). User defined groupings are used to divide the results into a plurality of groups (step 612), such as results from one or more groups of peers, results from one or more groups of team members, and results from all other users. The results within each group are aggregated (step 614). The aggregated results are then ranked within the group (step 616). The results within each group are ranked by applying feedback and frequency rankings to the aggregate results. The ranked results are returned to the requestor (step 618) and the operation ends.

Thus, exemplary embodiments provide for solving application failures by leveraging user-defined and structural social relationships. The social relationships are used to filter past experiences submitted by users with solving the same or a similar application failure as the failure experienced by the current user, in order to present the most relevant web links available to solve the current user's application failure. By providing results grouped and ranked according to the current user's social relationships, the highest ranked results will have a more targeted focus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for solving an application failure using social collaboration, the computer-implemented method comprising:
   receiving a search request from a requester to search a central repository of knowledge, wherein the search request comprises a user identity and an application failure problem to be solved, and wherein the central repository of knowledge comprises data regarding at least one previous attempt to solve an application failure problem compiled from registered users of the central repository of knowledge;
   determining whether the application failure problem to be solved exists in the central repository;
   responsive to a determination that the application failure problem to be solved exists in the central repository, collecting search results for at least one previous attempt to solve the application failure problem, wherein the search results comprise a universal resource locator;
   grouping the search results into a plurality of groups of search results corresponding to social groupings defined by the requester, to form grouped search results; and
   displaying the grouped search results to the requester.

2. The computer-implemented method of claim 1, further comprising:
   ranking the grouped search results within each group of the plurality of groups.

3. The computer-implemented method of claim 2, wherein ranking the grouped search results is based on feedback regarding the search results received from the registered users.

4. The computer-implemented method of claim 3, wherein the feedback regarding the search results comprises a frequency of access of a universal resource locator by the registered users.

5. The computer-implemented method of claim 3, wherein the feedback regarding the search results comprises feedback from a registered user.

6. The computer-implemented method of claim 1, wherein the plurality of groups corresponding to social groupings defined by the requester comprises:
   one or more groups of registered users designated as peers of the requester;
   one or more groups of registered users designated as team members of the requester; and
   a group of registered users designated as others.

7. The computer-implemented method of claim 1, further comprising:
   reviewing the grouped results by the requester;
   selecting a result from the grouped results;
   attempting a solution based on the selected result;
   responsive to attempting to solve the application failure problem, collecting results selected by the requester, forming collected results;
   presenting the collected results to the requester; and
   receiving input from the requester, wherein the input comprises feedback regarding universal resource locators selected by the requester.

8. A computer program product comprising:
   a computer recordable medium having computer usable program code for solving an application failure using social collaboration, the computer program product comprising:
   computer usable program code for receiving a search request from a requestor to search a central repository of knowledge, wherein the search request comprises a user identity and an application failure problem to be solved, and wherein the central repository of knowledge comprises data regarding at least one previous attempt to solve an application failure problem compiled from registered users of the central repository of knowledge;

computer usable program code for determining whether the application failure problem to be solved exists in the central repository;

computer usable program code, responsive to a determination that the application failure problem to be solved exists in the central repository, for collecting search results for at least one previous attempt to solve the application failure problem, wherein the search results comprise a universal resource locator;

computer usable program code for grouping the search results into a plurality of groups corresponding to social groupings defined by the requester, to form grouped search results; and computer usable program code for displaying the grouped search results to the requester.

9. The computer program product of claim 8, further comprising:

computer usable program code for ranking the grouped search results within each group of the plurality of groups.

10. The computer program product of claim 9, wherein ranking the grouped search results is based on feedback regarding the search results received from the registered users.

11. The computer program product of claim 10, wherein the feedback regarding the search results comprises a frequency of access of a universal resource locator by the registered users.

12. The computer program product of claim 10, wherein the feedback regarding the search results comprises feedback from a registered user.

13. The computer program product of claim 8, wherein the plurality of groups corresponding to social groupings defined by the requester comprises:

one or more groups of registered users designated as peers of the requester;

one or more groups of registered users designated as team members of the requester; and a group of registered users designated as others.

14. The computer program product of claim 8, further comprising:

computer usable program code for reviewing the grouped results by the requester;

computer usable program code for selecting a result from the grouped results;

computer usable program code for attempting a solution based on the selected result;

computer usable program code, responsive to attempting to solve the application failure problem, for collecting results selected by the requester, forming collected results;

computer usable program code for presenting the collected results to the requester; and computer usable program code for receiving input from the requester, wherein the input comprises feedback regarding universal resource locators selected by the requestor.

15. A data processing system for solving an application failure using social collaboration, the data processing system comprising:

a bus;

a communications unit connected to the bus;

a storage device connected to the bus, wherein the storage device includes computer usable program code; and a processor unit connected to the bus, wherein the processor unit executes the computer usable program code to receive a search request from a requester to search a central repository of knowledge, wherein the search request comprises a user identity and an application failure problem to be solved, and wherein the central repository of knowledge comprises data regarding at least one previous attempt to solve an application failure problem compiled from registered users of the central repository of knowledge; determine whether the application failure problem to be solved exists in the central repository; responsive to a determination that the application failure problem to be solved exists in the central repository, collect search results for at least one previous attempt to solve the application failure problem, wherein the search results comprise a universal resource locator; group the search results into a plurality of groups corresponding to social groupings defined by the requester, to form grouped search results; and display the grouped search results to the requester.

16. The data processing system of claim 15, wherein the processor further executes computer usable program code to rank the grouped search results within each group of the plurality of groups.

17. The data processing system of claim 16, wherein ranking the grouped search results is based on feedback regarding the search results received from the registered users.

18. The data processing system of claim 17, wherein the feedback regarding the search results comprises a frequency of access of a universal resource locator by the registered users.

19. The data processing system of claim 17, wherein the feedback regarding the search results comprises feedback from a registered user.

20. The data processing system of claim 15, wherein the plurality of groups corresponding to social groupings defined by the requester comprises:

one or more groups of registered users designated as peers of the requester;

one or more groups of registered users designated as team members of the requester; and a group of registered users designated as others.

* * * * *